United States Patent
Harkins, Sr.

(10) Patent No.: US 6,348,255 B1
(45) Date of Patent: Feb. 19, 2002

(54) SYNTHETIC RAWHIDE LACE

(75) Inventor: Daniel C. Harkins, Sr., Brockton, MA (US)

(73) Assignee: Brockton Plastics, Inc., Brockton, MA (US)

( * ) Notice: Subject to any disclaimer, the term of this patent is extended or adjusted under 35 U.S.C. 154(b) by 0 days.

(21) Appl. No.: 09/069,610

(22) Filed: Apr. 29, 1998

(51) Int. Cl.⁷ .................................. B32B 5/28
(52) U.S. Cl. ............... 428/151; 428/113; 428/107; 428/105; 428/373; 428/374; 428/375; 428/378; 428/390; 428/392; 428/394; 428/904; 428/522; 428/423.1; 428/424.6; 428/295.1; 428/295.4; 428/395
(58) Field of Search ................ 428/151, 113, 428/107, 105, 373, 374, 375, 378, 390, 392, 394, 395, 904, 522, 423.1, 424.6, 295.1, 295.4

(56) References Cited

U.S. PATENT DOCUMENTS

| | | | |
|---|---|---|---|
| 3,190,766 A | * 6/1965 | Yuan | 264/213 |
| 3,262,805 A | 7/1966 | Aoki et al. | 156/79 |
| 3,962,512 A | 6/1976 | Fontana et al. | 428/290 |
| 3,974,320 A | * 8/1976 | Gerlach et al. | 428/283 |
| 4,029,840 A | 6/1977 | Shikinami et al. | 428/310 |
| 4,110,139 A | * 8/1978 | Mashida et al. | 156/79 |
| 4,183,986 A | * 1/1980 | Blaetterlein | 428/160 |
| 4,419,372 A | 12/1983 | Greene et al. | 426/104 |
| 4,614,678 A | 9/1986 | Ganga | 428/74 |
| 5,462,993 A | 10/1995 | Ngoc et al. | 525/274 |
| 5,638,589 A | 6/1997 | Phillips | 24/715.4 |

* cited by examiner

Primary Examiner—William P. Watkins, III
(74) Attorney, Agent, or Firm—Elizabeth E. Nugent; Choate, Hall & Stewart

(57) ABSTRACT

An artificial leather strip, and methods of making such a strip. The synthetic leather strip is suitable for sporting applications such as lacing baseball gloves and shoes. The strip comprises at least one reinforcing cord embedded in a matrix. The matrix comprises PVC and additives such as nitrile rubber and/or urethane, and is sufficiently tough to resist the "cheesecutter" effect when the strip is flexed, for example by being tied in a knot.

13 Claims, 1 Drawing Sheet

SYNTHETIC RAWHIDE LACE

FIELD OF THE INVENTION

This invention pertains to a polymer composite lace which can be used in the place of natural rawhide laces. The lace can be used in a wide variety of applications, in particular in the use of sporting goods.

BACKGROUND OF THE INVENTION

Rawhide laces are traditionally used in a number of sports equipment applications, including baseball gloves and footwear such as hiking boots. While rawhide is relatively inexpensive, it is subject to wide variability in strength and suppleness. Defects in rawhide laces often go undetected until the lace separates in use. Further, the laces may stiffen when exposed to water and allowed to dry.

Various attempts have been made to manufacture synthetic laces which can simulate the strength and feel of natural rawhide. These designs generally have involved reinforcing an extruded thermoplastic lace by embedding synthetic cords in the thermoplastic matrix. Various surface treatments and pigments can be used to simulate the patina of leather. While these laces have found application in the craft and ornamentation industries, they have been found to be unsuitable for sporting applications. When the laces are flexed, and particularly when they are repeatedly flexed and bent through sharp angles as in tying a tight, compact knot, the synthetic cords tend to cut through the thermoplastic matrix and emerge at the surface (the "cheesecutter" effect). This type of failure is illustrated in FIG. 1 of the drawing. Because of this effect, prior art laces can only be used in applications where they will not be bent through sharp angles or flexed repeatedly.

A need therefore still exists for a synthetic rawhide lace which can be repeatedly flexed and tied, and which exhibits a greater uniformity and reliability than natural rawhide.

SUMMARY OF THE INVENTION

In one aspect, the invention comprises a strip of artificial leather comprising at least one reinforcing cord encased in a matrix, where the cord remains encased in the matrix when the strip is subjected to a migration test by pulling over a ¼" at a load of at least 4500 pounds per square inch of cross-sectional area of the strip (4.5 ksi). In a related aspect, the invention comprises a strip of artificial leather comprising at least one reinforcing cord encased in a matrix, where the cord remains encased when the strip is subjected to a migration test by pulling to its breaking strength. In both of these embodiments, the matrix comprises poly(vinyl chloride) and either nitrile rubber or urethane. The reinforcing cord or cords may be made, for example, of polyester. The combined strength of all cords may be at least 8000 pounds per square inch of cross-sectional area of the strip. The matrix may incorporate additives such as fibers, particles, flock, leather dust, hydrocarbon resins, and plasticizers. The outer surface of the strip may be embossed or given an appearance of leather. The flex modulus of the strip may be matched to that of rawhide. The strip may be sufficiently strong and flexible that a tight, compact knot can be tied in the strip without migration of the reinforcing cords to the surface of the strip.

In another aspect, the invention comprises methods of making artificial leather strips. These methods include extruding matrix material around cords (e.g., polyester cords), or coextruding a thermoplastic reinforcing filament with the matrix. The matrix material comprises poly(vinyl chloride) and nitrile rubber or urethane. The reinforcing elements may remain encased in the matrix when the strip is subjected to a migration test using a force greater than 4500 pounds per square inch of cross-sectional area of the strip, or using a force equal to the breaking force of the strip.

BRIEF DESCRIPTION OF THE DRAWING

The invention is described with reference to the several figures of the drawing, in which.

DETAILED DESCRIPTION OF PREFERRED EMBODIMENTS

A synthetic leather lace according to the invention is strong, has the appearance of natural rawhide, and is resistant to the cheesecutter effect under repeated bending and tying. These objects can be accomplished by embedding synthetic cords in a suitable thermoplastic matrix. While a pure poly(vinyl chloride) (PVC) matrix has been found to exhibit a cheesecutter effect at low loads, I have found that this effect can be greatly inhibited or eliminated by the introduction of modifying agents into the PVC matrix. Some agents which have been found to be effective are compatible polyurethanes and elastomers. Particularly effective is polynitrile rubber used in conjunction with a high molecular weight PVC.

A lace according to the invention, then, comprises a thermoplastic matrix with one or more continuous reinforcing fibers therein. In one preferred embodiment, the fibers are at least 2600 denier polyester cords. In another preferred embodiment, the reinforcement comprises a higher tensile-strength thermoplastic than the matrix material. In this embodiment, the reinforcing element(s) may be coextruded with the matrix to form the synthetic lace. The matrix material is generally PVC-based, but includes additives such as polyurethanes and/or elastomers which toughen the material, reducing the cheesecutter effect.

It is a further advantage of the laces of the invention that characteristics such as tensile strength and flexibility can be varied to match the intended conditions of use. Other characteristics such as knot integrity and appearance can also be easily and repeatably controlled. For example, a number of processes which can impart a leather-like appearance to PVC are known in the art; these processes can be used to simulate a natural rawhide leather lace.

The sensitivity of a lace to the cheesecutter effect can be determined using, for example, a Scott tester™ to perform a migration test. The migration test involves wrapping a single loop of a lace around a mandrel, and measuring the amount of tensile force applied to the ends of the lace necessary to cause the interior cords to cut through the matrix and emerge at the surface of the lace. Prior art laces consisting of polyester cords embedded in a 3⁄16"×3⁄32" PVC matrix were found to begin to migrate at a tension of 55 lbs (3.1 ksi), and to exit the lace surface at a tension of 71 lbs (4.0 ksi), when tested over a ¼" mandrel by this procedure.

™ "Scott tester" is a trademark of Precision Scientific, Inc.

EXAMPLES

Figure 2:
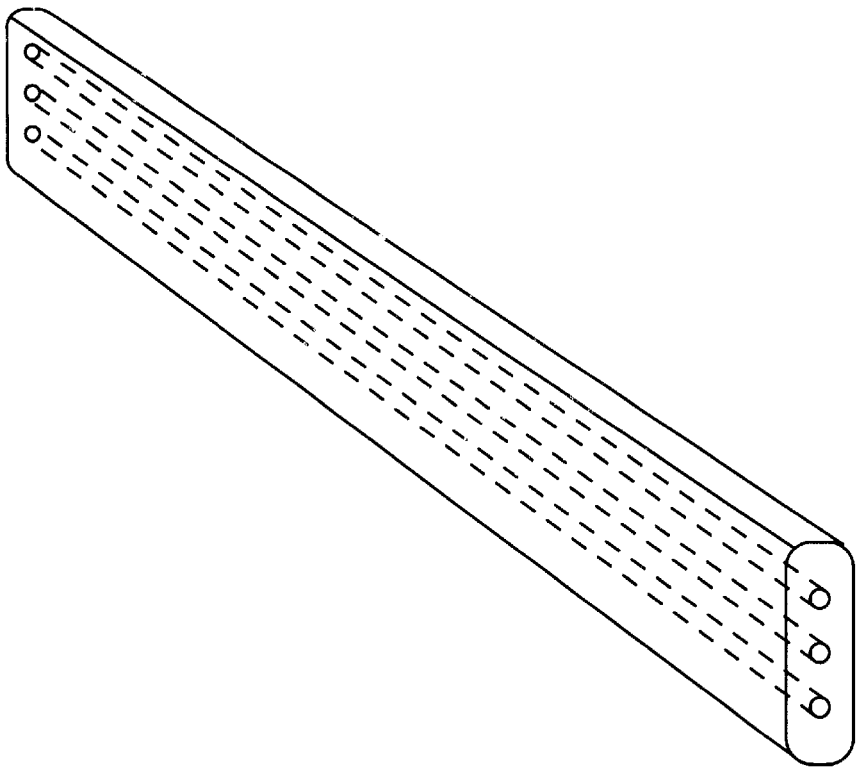
FIG. 2 shows a lace according to the invention.
Figure 1:
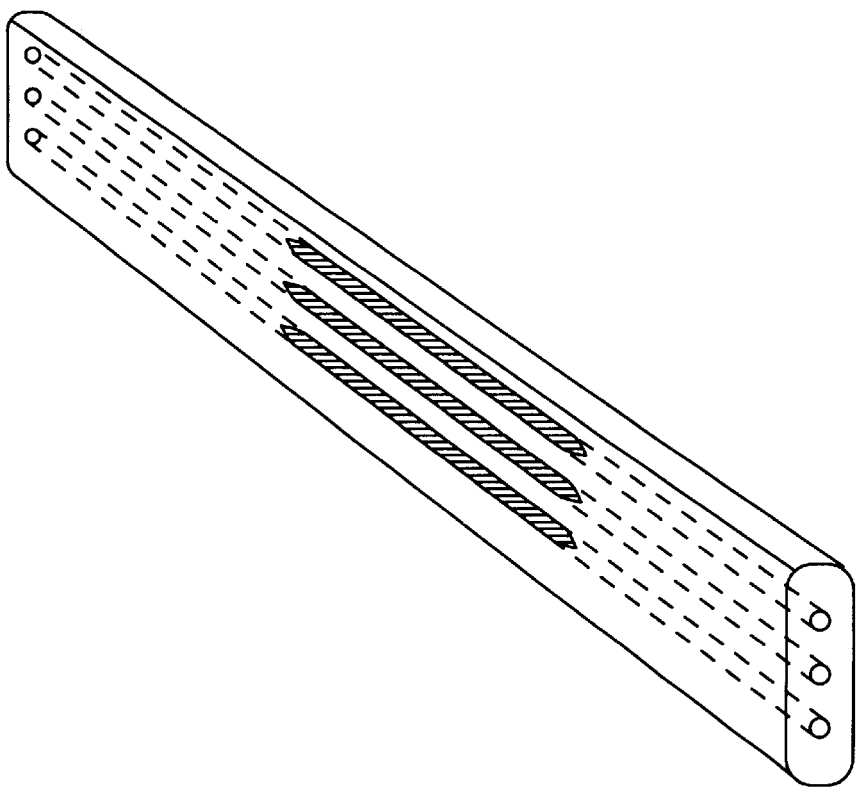
FIG. 1 illustrates the "cheesecutter" effect, a failure mode experienced by many prior art synthetic laces.

FIG. 2 of the drawing illustrates a lace according to the invention. The illustrated embodiment is a 3⁄16"×3⁄32" lace with three embedded polyester cords of 2600 denier each.

The matrix is a PVC resin with polynitrile rubber, plasticizer, and other additives. A number of formulations which were produced and tested using this geometry are given in Table 1. Measured durometer ratings and migration test results are given in Table 2, as well as evaluations of the hand (flex modulus) of each lace. Samples 1, 2, and 3 represent prior art laces not containing the matrix additives of the invention. Samples 2 and 3 exhibited cheesecutter effect at low loads, while sample 1 was too stiff to use for most lacing operations. Samples 4, 5, and 6, however, which contain either nitrile rubber or urethane additives, combined relatively supple hands with an excellent resistance to the cheesecutter effect.

TABLE 1

| Material | Sample 1 | Sample 2 | Sample 3 | Sample 4 | Sample 5 | Sample 6 |
| --- | --- | --- | --- | --- | --- | --- |
| Medium molecular weight PVC resin | 50 | 50 | 50 | 40 | 32 | 0 |
| High molecular weight PVC resin | 0 | 0 | 0 | 7 | 7 | 40 |
| DIOP plasticizer | 25 | 45 | 34 | 14 | 19 | 22 |
| Polymeric plasticizer | 0 | 0 | 0 | 3.5 | 6 | 0 |
| Secondary plasticizer | 2 | 20 | 2 | 4 | 8 | 0 |
| Calcium carbonate filler | 10 | 10 | 20 | 5 | 1 | 20 |
| Nitrile Rubber | 0 | 0 | 0 | 4 | 4 | 0 |
| Flock | 3 | 3 | 0 | 1 | 2 | 10 |
| Urethane | 0 | 0 | 0 | 0 | 0 | 25 |

TABLE 2

| Sample | Durometer | Migration | Hand |
| --- | --- | --- | --- |
| 1 | 85 | No migration observed at 103 lbs (5.9 ksi). | stiff |
| 2 | 65 | Reinforcing cords begin to migrate at 26 lbs (1.5 ksi), came to surface at 32 lbs (1.8 ksi). | supple to rubbery |
| 3 | 70 | Reinforcing cords begin to migrate at 55 lbs (3.1 ksi), came to surface at 71 lbs (4.0 ksi). | rubbery |
| 4 | 70 | No migration observed at 104 lbs (5.9 ksi); breaking strength of strip was 140 lbs (8.0 ksi). | supple |
| 5 | 75 | No migration observed at 102 lbs (5.8 ksi). | supple to moderate |
| 6 | 65 | No migration observed at 106 lbs (6.0 ksi). | rubbery |

Sample 4 was compared to natural rawhide laces for manufacturing baseball gloves. It was found that gloves could be stitched much faster with the synthetic lace, due to its uniformity and dimensional integrity. Further, the synthetic lace exhibited a breaking strength of 140 lbs (8.0 ksi) with a deviation of ±5%, as opposed to the natural rawhide lace, which exhibited a breaking strength of 110 lbs (6.3 ksi) with a deviation of ±20%. Thus, broken laces due to defects in the rawhide which are not visually apparent can be avoided by the use of the synthetic lace. Similar results are expected when the laces of the invention are used to lace shoes or boots.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. An elongated strip of artificial leather, comprising
   at least one reinforcing cord, completely encased in a matrix comprising poly(vinyl chloride) and at least one of nitrile rubber and urethane,
   wherein the cord remains encased in the matrix when the strip is subjected to a migration test over a ¼" mandrel with a force of at least 4500 pounds per square inch of cross-sectional area of the strip.

2. An elongated strip of artificial leather, comprising
   at least one reinforcing cord, completely encased in a matrix comprising poly(vinyl chloride) and at least one of nitrile rubber and urethane,
   wherein the cord remains encased in the matrix when the strip is subjected to a migration test over a ¼" mandrel with a force sufficient to break the strip.

3. The elongated strip of claim 1 or 2, further comprising a surface layer having the appearance of leather.

4. The elongated strip of claim 1 or 2, wherein the reinforcing cord comprises polyester.

5. The elongated strip of claim 1 or 2, wherein the combined strength of all reinforcing cords encased within the matrix is at least 8000 pounds per square inch of cross-sectional area of the strip.

6. The elongated strip of claim 1 or 2, wherein the matrix further comprises additives selected from the group consisting of fibers, particles, flock, leather dust, hydrocarbon resins, and plasticizers.

7. The elongated strip of claim 1 or 2, wherein an outer surface of the strip is embossed.

8. The elongated strip of claim 1 or 2, wherein the strip has a flex modulus equivalent to that of natural rawhide.

9. The elongated strip of claim 1 or 2, wherein the strip is sufficiently flexible to be tied in a compact knot, and all reinforcing cords remain encased in the matrix when the strip is so tied.

10. The elongated strip of claim 1 or 2, wherein the matrix comprises at least 30% poly(vinyl chloride).

11. The elongated strip of claim 10, wherein the matrix comprises at least 40% poly(vinyl chloride).

12. The elongated strip of claim 10, wherein the poly(vinyl chloride) is of high molecular weight.

13. An elongated strip of artificial leather, comprising
   at least one reinforcing cord, completely encased in a matrix comprising
   poly(vinyl chloride) and at least one of nitrile rubber and urethane,
   wherein the cord remains encased in the matrix when the strip is tied in one or more tight knots.

* * * * *